United States Patent [19]

Ingram et al.

[11] Patent Number: 5,091,869
[45] Date of Patent: Feb. 25, 1992

[54] COMPUTER INTEGRATED FLOOR PLAN SYSTEM

[75] Inventors: Terry D. Ingram, Benton; Randy Wolverton, Alexander, both of Ark.

[73] Assignee: Expert Technologies, Inc., Bryant, Ark.

[21] Appl. No.: 509,862

[22] Filed: Apr. 16, 1990

[51] Int. Cl.$^5$ .......................... G01C 5/00; G06F 15/00
[52] U.S. Cl. ...................................... 364/560; 364/512
[58] Field of Search ...................... 364/512, 560, 559; 350/102, 112; 434/72, 79; 33/1 T, 296, 700, 293, 291, 299, 295, 262

[56] References Cited

U.S. PATENT DOCUMENTS

| | | | |
|---|---|---|---|
| 3,192,633 | 7/1965 | Pratt | 33/293 |
| 3,271,865 | 9/1966 | Glidden et al. | 33/295 |
| 3,350,783 | 11/1967 | Whitehead | 33/293 |
| 4,146,927 | 3/1979 | Erickson et al. | 364/560 |
| 4,295,201 | 10/1981 | Wiklund | 364/560 |
| 4,470,664 | 9/1984 | Shirasawa | 350/102 |
| 4,519,674 | 5/1985 | Buckley et al. | 350/102 |
| 4,642,780 | 2/1987 | Thomson | 364/512 |
| 4,700,318 | 10/1987 | Ockman | 364/512 |
| 4,811,243 | 3/1989 | Racine | 364/560 |
| 4,820,041 | 4/1989 | Davidson et al. | 33/293 |
| 4,831,546 | 5/1989 | Mitsuta et al. | 364/512 |
| 4,875,291 | 10/1989 | Panique et al. | 350/102 |
| 4,926,561 | 5/1990 | Miller | 33/293 |

*Primary Examiner*—Kevin J. Teska

[57] ABSTRACT

A method is provided for devising a floor plan of an existing building in which angles and distances are measured from an interior traverse point. A surveying instrument is set up at a selected traverse point and distances and angles are measured to prominent points on the interior walls. Additional set ups are made to other interior portions and referenced to each other in order that the prominent portions such as corners of the walls and ceilings and the like may be measured and collated in the computer data collector. The traverse points, angles and distances are recorded in a data collector, transferred to a computer and by means of software are plotted on a coordinate field and with a computer aided design drafting system printed out on paper to provide a floor plan of the building. The surveying instruments employed may be an electronic distance measurement instrument and a theodolite for measuring angles which may be combined in a total station instrument.

10 Claims, 4 Drawing Sheets

5,091,869

COMPUTER INTEGRATED FLOOR PLAN SYSTEM

BACKGROUND OF THE INVENTION

In the past most buildings have a set of paper plans, floor plans or the like on which the architects or consultants made notes on construction changes and other modifications.

These "as built's" usually are a good record of construction changes, but they are often a poor representation of the actual floor plan of the building.

The owner, when faced later on, sometimes years later, with a need for his plans, usually has to give his architect or his consultants a set of these "as built's". If they plan to use these on a computer as a basis for a remodel or whatever, they currently have two options: the "as built's" can be digitized or they can be scanned. Both procedures put paper plans into a computer format usable by a CAD (computer aided drafting) procedure. However, both systems produce computer plans only as accurate as the paper plan they came from. Any additions made to these plans on a computer will be very precise. This is the inherent nature of the computer drafting system. But the plans will never be current because the base information was not accurate.

The designer can take these plans to the field to verify them. With plan and tape measure in hand he attempts to determine the accuracy of the plan. It is relatively easy for him to determine proper room sizes, but only the most thorough will check wall thicknesses, squareness and details. In total absence of "as built's" drawings this job of field tape measuring can be monumental and mistakes can easily be made.

SUMMARY OF THE INVENTION

The computer integrated floor plan system of this invention is designed to overcome the deficiencies in the current procedure for producing accurate base floor plans. The building itself is the only truly accurate basis for a truly accurate plan. Therefore, the building must be measured. However, the use of a tape measure, even by the skilled is not accurate enough. The computer integrated floor plan system and method of the invention measure the building very accurately. Using a total station instrument which is a combination EDM (Electronic Distance Measurement) device which is accurate to 0.01' (One Hundredth of a foot) and a theodolite which measures the angles accurate to 5 seconds of arc, points are shot in the building which are relative to all other points. Each point is accurately assigned an angle and distance which defines its exact location on an X-Y coordinate grid.

The instrument used to shoot these points displays the angle and distance information on its screen then, on command, it transfers this information to a separate data collector which stores all the point information.

Building points are shot from a location called a traverse point. These are locations where the instrument is set. Traverse points are also recorded in the data collector.

The distance is measured from the traverse point to the prominent point using a beam reflecting prism at the prominent point. As a feature of the invention the prism is provided with a shank or probe at the rear which is registered with the prominent point. The shank may be fitted into corners which will not receive the prism.

Building points can be shot from different traverse points. This puts a self checking feature in the system. Another check is made when the first point shot is also the last point shot. When these point coordinates are calculated and checked, it verifies a closure and the degree of accuracy.

As points are shot and transferred to the data collector, the operator keys in information to define the point which will be used later to draw the walls, doors, windows and other prominent features that may be defined as entities.

When the desired points have been shot, the information from the data collector is transferred to a CAD capable computer. This can be done by direct connection, disk, or by telephone modem.

Software is then used to make the necessary calculations with the field data to build an X-Y coordinate file which is employed to provide the floor plan, ceiling plan, roof plan or the like in a two dimensional manner. The term floor plan used herein is meant to include such ceiling and roof plans. The software also puts the prominent point information and the description code the operator has keyed into a format understood and accepted by the CAD software. When the CAD software receives this information file, it can then instantaneously draw the floor plan.

This plan is now in the CAD format. It is very much the same as if the plan had orginally been drawn on a CAD system. The professional now has an accurate base from which he can perform any changes he may wish.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWING

DESCRIPTION OF THE INVENTION

In the practice of the system and method of the invention an electronic total station is employed to make the necessary measurements to provide an interior floor plan of the building. This is a battery powered commercially available engineering instrument capable of measuring distances and horizontal and vertical angles. The distance measuring feature is called a EDM (electronic distance measurement) that is capable of measuring distances from six inches to two miles at an accuracy of approximately 0.01 (one hundredth) of a foot. This measurement is obtained by leveling the instrument and then lining the cross hairs of the instrument on a prism. The EDM emits an infrared beam toward a reflector prism located at the prominent point to be measured and uses a two way travel time to determine distance. The EDM internally adjusts for the height difference of the instrument and the prism and gives a true horizontal distance. It also makes adjustments for environmental factors such as temperature, humidity, and elevation. Within seconds of the shot the distance measurement is displayed on the screen of the instrument to two decimal places. Typical instruments are those manufactured by Zeiss as a Zeiss Elta 4 and the Leitz Company as Set 2, 3 or 4.

The second main feature of the total station instrument is its ability to measure angles. It can do this accurately to 5 seconds of arc. The angle measurement is made simultaneously with the distance measurement and is also displayed on the screen. The total station also contains an optical plumet to allow it to be positioned over the traverse points. The instrument is conventionally mounted upon a tripod positioned directly above the traverse point.

The prism employed is commercially available engineering targeting tool used to reflect the infrared beam from the EDM. It is also commercially available, e.g. from the aforementioned Zeiss and Leitz companies. In the invention process it is hand held with a specially made unique shank or probe attachment that always positions the prism face a predetermined distance from the desired object to be measured. This is necessary so the assistant can hold the prism tightly against the object to be measured without getting his hand over the prism face. It is also especially useful in corners where the prism would not physically fit. This predetermined distance can be compensated for in the EDM as a prism offset in a conventional manner by adjustment of the EDM.

Figure 3:
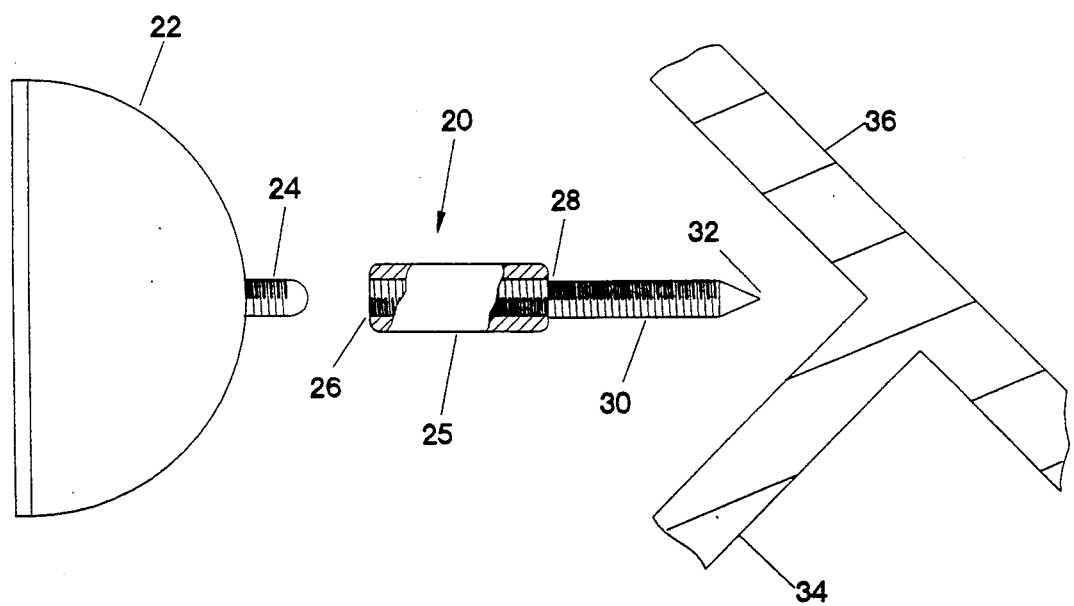
FIG. 3 is a top plan view partly in section of a prism provided with the shank fitting of the invention employed in a wall corner.

The prism probe and shank attachment of this invention is shown in FIG. 3. It is indicated by reference numeral 20 and is attached to the rear of prism 22 at a threaded stud 24. The probe is comprised of an elongated housing 25 having a threaded tapped opening 26 at one end which is fitted on the stud 24. At an opposite end a threaded tapped opening 28 receives a threaded rod 30 in longitudinally adjustable relationship. The rod 30 is provided with a pointed contact end 32 which is adapted to be placed in contact with the prominent point to be measured such as the corner 34 shown in the wall 36 of FIG. 3. Typically the length of the probe 20 when added to the prism is for example three inches. It will be understood that the length may be adjusted as desired and that a corresponding adjustment may be made in the EDM.

Figure 4:
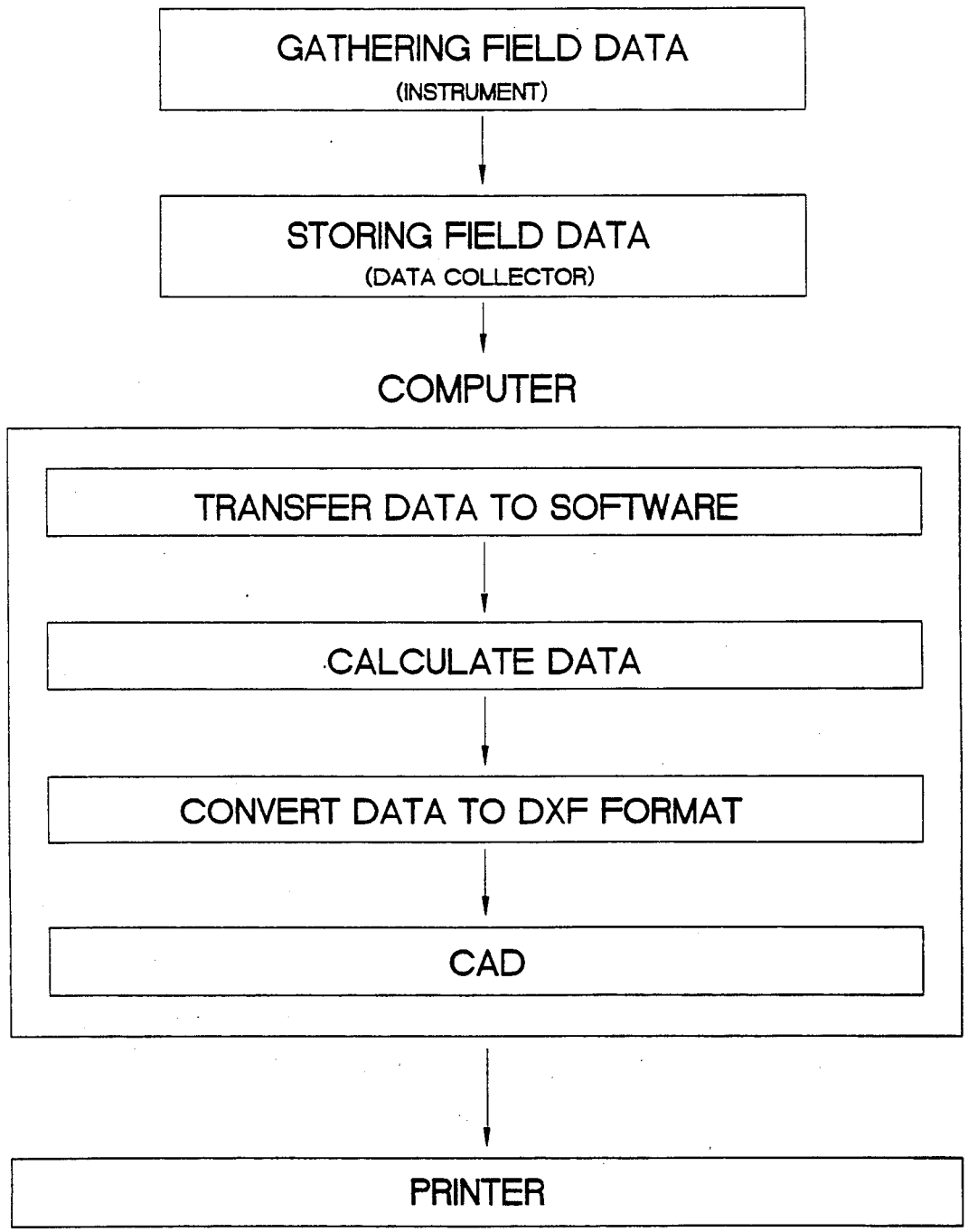
FIG. 4 is a block diagram showing the step employed in providing the floor plan.

A data collector is employed as shown in FIG. 4 for collecting the angle and distance measurements generated from the EDM total station instrument. The data collector may be employed as an accessory of the total station to receive information electronically from the total station with a communicating cable link. Alternatively, a commercially available data collector such as Casio may be employed. In the latter case the technician manually inputs the data from the total station screen to the data collector.

The invention is designed to be used on an IBM compatible computer. Since the invention will be used with commercially available CAD packages, the requirement for the CAD package should be met.

The computer software employed in the invention is compatible with any CAD package which accepts DXF, i.e., drawing exchange format.

The plotter employed is also a conventional commercially available plotter commonly employed with CAD and forms no part of this invention, per se.

The sequence of steps provided in the system and method of the invention are shown in FIG. 4 and will be more fully described hereinbelow.

The field crew employed consists of at least a two person team which contains a technician and his assistant. The technician generally operates the total station while the assistant holds the prism. The assistant will also mark the points on the floor to be shot and move and level the instrument over the traverse points. The technician measures and records the information, determines locations for the traverse points and determines prominent points to be shot.

Performing the actual building survey includes identifying the entities or features such as a room, wall, cabinet, rack and the like, measuring horizontal angles and distances to the prominent points defining the entities, and recording this information electronically with a data collector or manually. The technician determines the location of a favorable initial traverse point, as shown in FIG. 1, then has the assistant establish this point by putting a small square with a small black dot in the center directly on the floor, or by using a small piece of masking tape if carpet is present.

Figure 1:
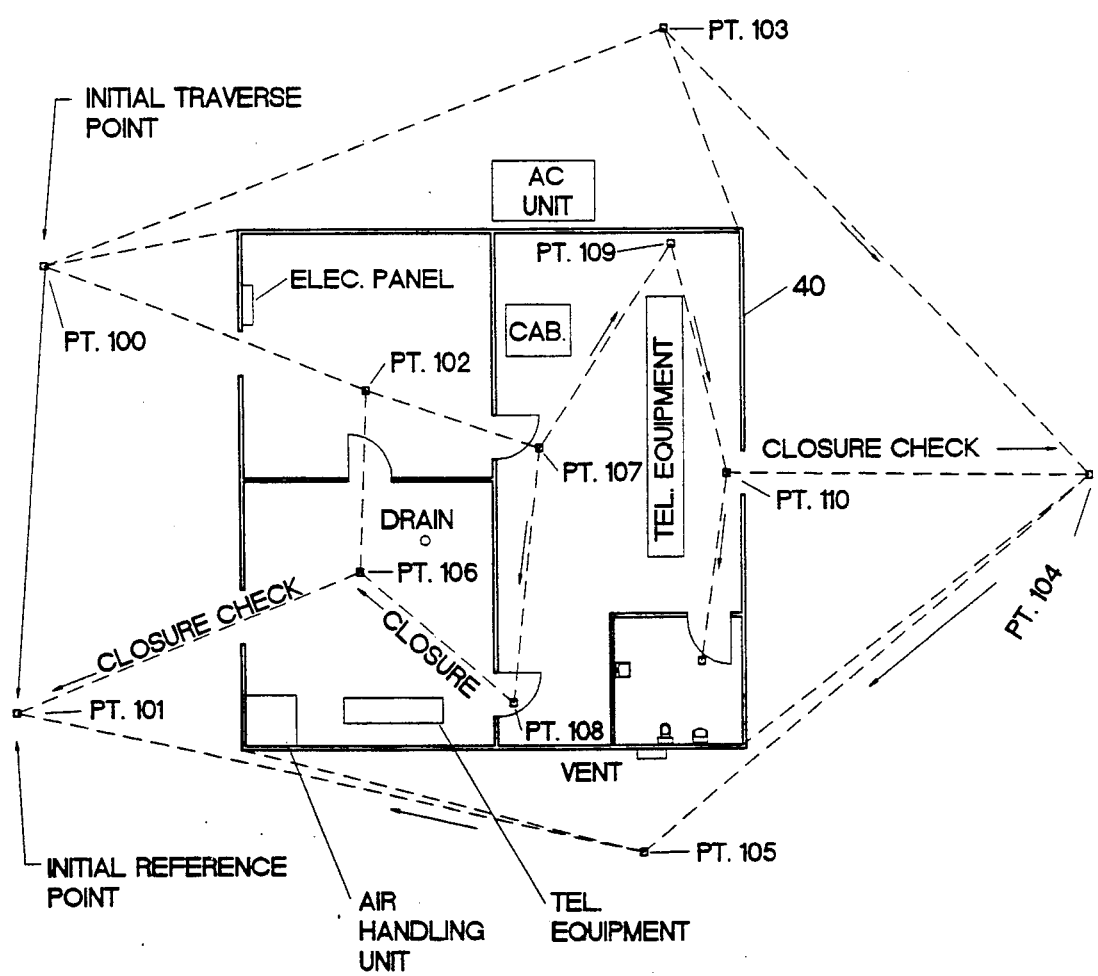
FIG. 1 is an enlarged top plan view of the traverse points and prominent points employed in creating an interior floor plan of a building.

The instrument is initially set up, as shown in FIG. 1 outside the building 40 to be measured, at traverse point 10. This initial traverse point is set up exteriorly in order that the thickness of the building walls may be measured. The instrument is centered and levelled over this initial traverse point. The technician determines a favorable reference (backsight) point and has the assistant establish the point in the same manner as was used for the initial traverse point 100 and label the point as point 101. The technician aligns the cross hairs in the instrument on the center of the initial reference point. He presses the ZERO SET button on the instrument to obtain a zero reading on the instrument display so that now the instrument is zeroed out and perfectly aligned between the initial traverse and reference points.

The assistant positions the prism (which allows a distance reading to be taken) directly on the initial reference point by putting the contact point 32 of the probe 20, which is attached to the back of the prism, in the center of the point. Looking through the telescope the technician instructs the assistant to move the prism until the face of the prism is perpendicular to the instrument, and the center of the prism is centered on the cross hairs of the instrument. The technician then takes a reading from the instrument and records the data collector as shown in FIG. 4 information relating to the number identification of the traverse point, the distance and the angle to the point being shot.

Additional traverse points 103, 104 and 105 are then shot to provide an outside traverse loop to the building. Interior traverse points, 102, 106, 107, 108, 109, 110 and 111 may also be shot at this time. These can be shot at any time from any other traverse point and it should be noted in FIG. 1 that traverse points 102 and 103 were shot from traverse point 100. All of the traverse points can be established initially, but it is usually less time consuming to shoot as many building entity points as possible from each traverse point before moving on. Thus, it saves setting the instrument back up on the same traverse point twice.

Figure 2:
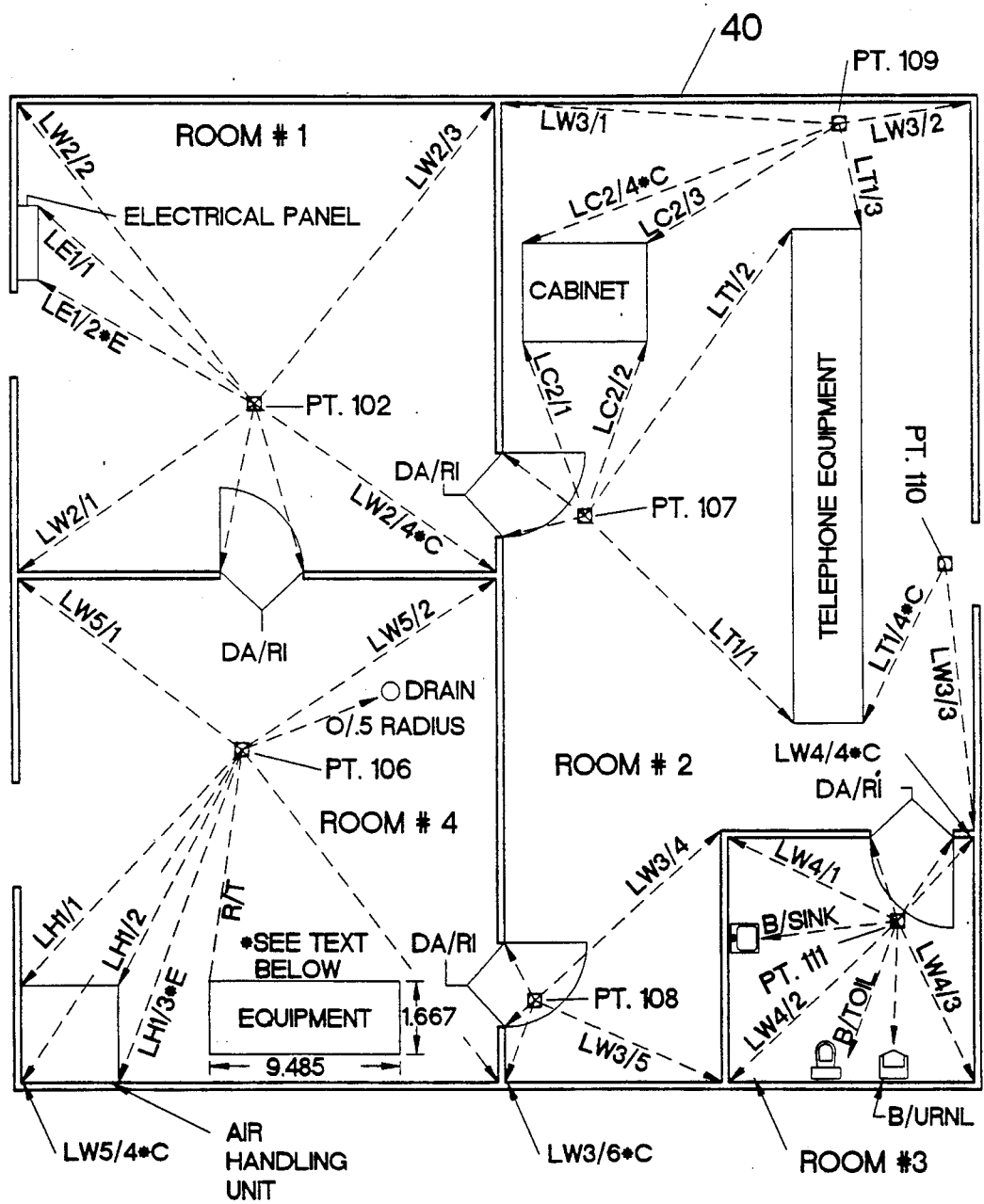
FIG. 2 is an enlarged view of the interior floor plan of FIG. 1.

Entity points are defined as part of the floor plan configuration such as prominent points defining an entity such as a corner, door frame, wall edge, cabinet or the like. In order to locate the prominent points of the entity (which may also be defined as entity points) the technician will pick any wall corner. The assistant goes to that corner, positions the shank tip 30 of the prism probe 20 in the corner 34 and approximately lines the prism face with the instrument. The point is shot as described above. When the distance and angle for that point is determined it is entered into the data collector, for example, as LW2/1/(horizontal angle) (horizontal distance). This defines the point as command identifier—LW2/1, line, wall entity #2, point 1 and is shown in FIG. 2. In this example this point is shot from traverse point 102.

The assistant will continue to the next wall corner (or entity) position until all the prominent points of the building components are shot in this manner and are defined as different entities, (for example: walls, windows, doors, mechanical equipment, drains, telephone equipment). All are defined by a one or two letter code. The last prominent point shot that defines an entity is issued a special code that ends or closes that entity. An E code ends the segment and C code closes the entity to the previous starting point. An example of this is LW2/4*C (horizontal angle)/(horizontal distance).

After all the prominent points defining the entities have been shot from one traverse point the technician will then direct the assistant to a new traverse point. This point will be used to link the subsequent set up to the current setup. For example: traverse point 106 is shot from traverse point 102. The traverse point is then shot in the same manner and is listed in the data collector as:/106/(horizontal angle/ (horizontal distance). The new traverse point 106 is now shot but need not be occupied until later in the traverse. The same procedure is then used to make traverse point 107 and it is called—/107/(horizontal angle)/(horizontal distance).

The instrument is then moved to the new traverse point 107, levelled and centered on the point. The technician shoots another group of entities from the 107 setup as previously done. He continues following this procedure until all entities are shot. When moving through the building it is a good policy to whenever possible shoot back to the previous traverse points. This builds in a self checking mechanism and establishes a tie closure. The survey team proceeds through the entire floor in this manner shooting all entities and their traverse points.

The exterior of the building may also be shot from the outside traverse loops at points 100, 101, 103, 105 and 106. This is done to determine wall thicknesses and the shots are shown in dotted lines in FIG. 1 to the four building corners. A typical building may have thousands of points depending on the detail desired.

In moving through the buiding, the technician has various command identifiers to choose from to define the various types shots that may be required. They are as follows:

A—ARC
B—BLOCK
C—CIRCLE
D—DOOR
E—EXTEND
J—LINE
O—OFF SET
PO—POINT
PE—PERPENDICULAR
R—RECTANGULAR REFERENCE
T—TEXT
W—WINDOW

The technician also has the following calculation operators from which to choose.

+ SET UP
: FORSIGHT
− NEXT FORSIGHT
? TIE SHOT
, REMARK OR COMMENT

EXAMPLE FORMAT FOR BLOCKS

| TYPE | POINT | HORIZONTAL angle | DISTANCE |
|---|---|---|---|
| B (Block name) | | 123.1245 | 12.25 |

BLOCKS are used to show such items in a building that do not require an exact representation by surveying, but where a standard symbol would work sufficiently.

EXAMPLE: Sinks, toilets, gas and water utility symbols, and fire related symbols such as fire hoses, fire alarms, and fire cabinets. B is searched for when extracting records to write to a DXF file. The BLOCK NAME directly follows the "B" (TYPE indicator). The specified block will be inserted into the drawing at X-Y coordinate locations associated to the horizontal angle and distance Measurements. The term "horizontal angle" is used throughout for horizontal angle and is listed in degrees, minutes and seconds. This type of identifier is equivalent to the CAD system INSERT command. Horizontal angle and horizontal distance measurements remain the same.

All of the information required to perform this command is found on one line of this data file. Therefore, future improvements will enable the setting of scale factors and rotation of the BLOCK which will require the use of more than one line to perform this command.

EXAMPLE FORMAT FOR CIRCLES

| TYPE | POINT | HORIZONTAL ANGLE | DISTANCE |
|---|---|---|---|
| C radius | Selection Characters | 123.1245 | 6623 |

CIRCLES are used to show items such as floor drains, conduits, pipes, or other items in a building where a circle may need to be represented. This will allow a CAD system to draw a CIRCLE with the center specified by the X-Y coordinates associated with the Horizontal Angle and Distance measurement and then drawn with a radius equivalent to that listed in the TYPE column selected. C is the type of indicator that is searched for when extracting records to write to a DXF file.

RADIUS is a numeric value expressed in an engineering format. This value will appear below the TYPE indicator. It is five characters in length and leaves room for an indication determining whether the CIRCLE is solid or open. A solid circle is indicated by an "S" under the TYPE indicator, in front of the RADIUS measurement and after the "C". This type of identifier is equivalent to a CAD system's CIRCLE command. All of the information required to perform this command is found on one line of the data file.

The Selection Characters under the POINT indicator may extend the full length of the field. This field allows for a descriptive name of up to six characters to identify the shot. The identifier will allow certain records to be extracted. Use of @ symbol to extract all the shots with the C TYPE indicating a circle.

The Horizontal Angle is then measured from the backsight to the center of the circle and recorded in the HORIZONTAL angle column. The Horizontal Distance is then measured from the instrument setup located to the center of the circle. The information is then recorded in the DISTANCE column.

In shooting doors as in FIG. 2, Room 1, the door is shot from traverse point 102. In order for the door swing to be shown properly the doors are always shot with the swing toward the instrument. The technician always shoots the hinge side first and then the strike side.

EXAMPLE FORMAT FOR DOORS

| TYPE | POINT | HORIZONTAL ANGLE | DISTANCE |
|---|---|---|---|
| D Door | Hinge/Swing | nnn.nnnn | nnn.nnnn |

DOORS are located in the buildings and drawn in an open position. HORIZONTAL ANGLES and HORIZONTAL DISTANCE measurements are used for the placement of the HINGE and STRIKE side of the DOOR and ARC. The actual DOOR size will be computed by the program to be equivalent to the numeric values of the X-Y Coordinates associated to the HORIZONTAL ANGLE and HORIZONTAL DISTANCE of the two records in the data file.

EXAMPLE FORMAT FOR POINTS

| TYPE | POINT | HORIZONTAL ANGLE | DISTANCE |
|---|---|---|---|
| PO | Selection Characters | 123.1245 | 66.23 |

It should be kept in mind that the TYPE is an absolute. The POINT, HORIZONTAL ANGLE, and the DISTANCE measurement are variables. PO designates any point under the TYPE category. Points are used to show items in a building that do not fall under one of the other categories. The entire building could be represented by points, then allowing the CAD operator to "connect the dots". This method is not always feasible or practical because of the large number of points required to represent a building and the complexities imposed in trying to figure out what a point is supposed to represent. Therefor, other codes may be employed that enable line drawings, circle drawings, block insertion, text placement, and other intelligent procedures to be used by the software. POINTS will show up on the computer screen only as dots; very accurate dots.

The SELECTION CHARACTERS, HORIZONTAL ANGLES, and HORIZONTAL DISTANCE measurements are the same as for the circles. PO is searched for when extracting records to write to a DXF file. This type of command, the identifier, is equivalent to the system point command. All of the information required to perform this command is found on one line of this data file representing such items as building walls, telephone equipment, or any other object requiring a line segment.

To locate line entities the variables for Type, Point, Horizontal angle, and Distance are grouped in columns and are used in the field by the technician to record the information. This information may be stored on paper field notes or electronically with the data collector. This column variable format is an exact match of the column format used by the calculation program. This allows for easy transfer of field gathered data to the calculation software.

The calculation program may use two additional columns to store the X-Y coordinate values associated with the horizontal angle and distance to the line entities.

Format for lines:

| Type | Point | Horizontal | Distance |
|---|---|---|---|
| Lcnnn | nnnnn | nnn.nnnn | nnnnnnn |

The "L" identifier is equivalent to the CAD system's line command. It will be used to enable line drawing between sequential survey shots found in the data file. The "L" is used to designate that a Line segment is to be drawn. The "L" is searched for in the data file when extracting lines to be written to the DXF file used in the CAD procedure.

The Selection Character follows the "L" and will be another single character (here represented as "c") describing the entity. This character will serve as a selection code used to group survey shots (point, records, segments) together to form line entities. Normal characters includes letters A to Z. These letters may be used to represent certain types of lines to allow grouping and layering within the CAD system.

Examples

"A" Air handling equipment (air conditioner and furnace)
"B" Batteries and associated equipment
"C" Columns
"E" Electrical panels and boxes
"F" Fences
"G" General lines
"T" Telephone equipment (in telephone office buildings)
"W" Walls These selection characters must be used to enable the program to draw the lines between the different survey shots comprising an entity such as walls, columns, desks, cabinets and telephone equipment as example of entities. All successive points on an entity must use the same selection code. Following the selection character will be a numeric value representing the number of the line entity. This may be from 1 to 99999 and will allow further identification of the line entity within the selection character.

Example

LW1 line entity 1 of W selection code representing a Wall
LW2 line entity 2 of W selection code representing a Wall
LC1 line entity 1 of selection code representing a Column
LC400 line entity 400 of selection code C representing the 400th column to be located in this building.

A line entity is simply a collection of lines. The minimum number of points to comprise a line entity is 2, maximum is 999999. Columns will usually have 4 line segments, Walls may have as many as a hundred or as few as two, but all of the column or wall points will have the same entity number. Column 400 will have 4 points, column 401—4 points, wall 3 may have 100 points, wall 10 may have only 2 points, and so on. Two points will draw only 1 segment, 3 points will draw either 2 segments or 3, depending on the special code used to indicate the last point of the entity.

The next information is the point number. This is a numeric value found in the Point column of the data file and described briefly above. This number represents the segment number of the line entity. this number is usually sequential; 1,2,3 . . . but does not have to be. The program sorts this column numerically when writing the DXF file.

Example

LW1 1 (first point of line W, entity 1)
LW1 2 (second point of line W, entity 1)
LW1 3 (third point of line W, entity 1)

A special code may also be used to indicate that the line entity will end at this survey shot or one more line segment will be drawn from this point to the starting point of the entity.

Special codes employed are:

*E End the current line segment here, ending the entity
*C Close the line segment to the beginning of the entity drawing a line form the last point to the first point.

An Example of ending the line is:
LW1 1 (first point of line W, entity 1)
LW1 2 (second point of line W, entity 1)
LW1 3 (third point of line W, entity 1)
LW1 4*E (fourth and ending point of the W entity 1)

This will draw 3 line segments starting with point 1 and ending with point 4.

An Example of closing the line entity is:
LW1 1 (first point of line W, entity 1)
LW1 2 (second point of line W, entity 1)
LW1 3 (third point of line W, entity 1)
LW1 4*C (fourth and closing point of the W entity 1)

This will draw 4 line segments starting with point 1 and closing the entity (drawing a line from point 4 to point 1). The same thing may be accomplished for LW2 (entity 2), Lw3, and so on . . . to LW99999, and also LAnnnn through LZnnnnn.

The horizontal angle and distance columns will contain numeric information only. The horizontal angle will be a value between 0 and 360 expressed in a DDD.mmss format (degrees .minutes seconds). This angle will be measured from the previous backsight to the desired point of the line entity. The distance will be a value from 0 to 9999999. A decimal point may be inserted at any location. Maximum characters used for the distance is 7. This distance is a horizontal distance measured from the instrument location to the desired point of the line entity.

A typical format for lines is listed below for a four sided entity, in this case a room grouped with a W selection code to indicate walls of the room, and using the special code *C to close the entity room. This entity is the 8th entity recorded in this building using the W selection character.

| Type | Point | Horizontal | Distance |
|------|-------|------------|----------|
| LW8  | 1     | 90.1245    | 10.123   |
| LW8  | 2     | 180.4512   | 12.429   |
| LW8  | 3     | 266.3526   | 8.644    |

-continued

| Type | Point | Horizontal | Distance |
|------|-------|------------|----------|
| LW8  | 4*C   | 355.5630   | 15.587   |

Rectangular references in the drawing may be simply made. As shown in FIG. 2 from traverse point 106 only two points of the telephone equipment in room 4 can be seen. To avoid setting two new traverse points to see all points of the equipment the technician first checks (with a tape) to see if the equipment is parallel to a wall segment. If it is he then shoots only one corner of the equipment and records the information for that shot with a R command identifier R/T (horizontal angle)/-(horizontal distance). Then he records the information for the wall segment referenced as follows: LW4/10 LW4–LW4/2 in the data collector and then records the parallel and perpendicular dimensions of the equipment in that order 9.485//1.667. These dimensions are derived using a tape measure. This method is especially helpful when a room is filled with objects that are parallel to each other and parallel to a referenced wall. Sometimes all points on an entity cannot be seen from one traverse point. This is not a problem. Entity points can be shot from any traverse point since all the traverse points are connected together and referenced to each other. As in FIG. 2 the telephone equipment in room 2 is shot from the traverse points 107, 109 and 110.

The "E" command identifier is used to draw 3 line segments. Two of these line segments will be perpendicular to a referenced line. The other segment will be drawn between the X-Y coordinate values of the two survey shots. A very common use would be the drawing of electrical boxes where the two corners of the box away from the line are shot.

A typical format used by the field technician to record the shot is:

| TYPE    | POINT     | HORIZONTAL ANGLE | DISTANCE |
|---------|-----------|------------------|----------|
| E       | selection | nnn.nnnn         | nnnnnnn  |
| E       | selection | nnn.nnnn         | nnnnnnn  |
| 'entity | point     | entity           | point    |

The "O" command identifier is used to draw a line segment that is parallel to a referenced line but offset from the reference line at a specified distance and direction indicated from the shot recorded by the technician. A common use would be the drawing of steps leading into a building, interior office type partitions, or any place where a parallel line would be required.

A typical format used by the field technician to record the shot is:

| TYPE    | POINT        | HORIZONTAL ANGLE | DISTANCE |
|---------|--------------|------------------|----------|
| O       | offset/dist  | nnn.nnnn         | nnnnnnn  |
| 'entity | point        | entity           | point    |

The "PE" command identifier may be used to draw a line segment perpendicular and connected to a reference line from the X-Y coordinate location associated with the horizontal angle and distance of the shot. A common use of this would be for a reflected ceiling grid plan or perhaps even electrical boxes of air handling equipment hanging on a wall in a building. The following format will be used by the field technician to record the shot. Two lines of the data file will be used to contain the required information to perform this operation.

| TYPE | POINT | HORIZONTAL ANGLE | DISTANCE |
|---|---|---|---|
| PE | selection | nnn.nnnn | nnnnnnn |
| 'entity | point | entity | point |

The software employed in the computer to provide for data calculation is written in a combination of compiler basic and assembly language as will be well understood in the art. It is designed to run on any IBM compatible computer. It features full screen scrollable input or editing, color displays, pull down menus, mouse support, dialogue command and action boxes, context sensitive help, use of multiple directories, communications link and plotter support. The software allows the user to perform the necessary calculations to convert the field data to a DXF file. In the employment of the software as shown in FIG. 4 the technician connects the data collector to the IBM compatible computer with a conventional communication cable. The technician then enters the software program on the computer. The program loads and the introductory screen appears. The blank editor screen is then caused to appear. The technician causes a menu bar to replace column headings and selects the file sub-menu by either picking it with the mouse or by typing it in from the conventional computer keyboard. All menu selections can be made in this manner. This pulls down the file sub-menu. He then uses the direction arrows in the computer or the mouse to highlight that the computer is ready "receive data from the collector". The technician then turns on the data collector to transfer the complete data file to the computer. The data transfers from the data collector to the computer running the software where it is converted to a format to be displayed on the conventional computer screen. The calculations from the data collections from the data collector are then made in the computer to provide X-Y coordinates. The technician again displays the menu bar and selects "CALCULATE DATA FILE" and the "CALCULATE DATA DIALOGUE" input box appears as a window. There are six prompts that must be answered.

1 "AZIMUTH OF LINE"—This is a numeric value that orients the grid of the collected data to a desired direction such as North. A typical answer would be 0 for North, 90 for East, etcetera.

2 "FROM TYPE COMMAND IDENTIFIER-POINT"—This is the character description of the first point of the line referencing to the direction selection in #1.

3 "TO TYPE POINT"—This is the character description of the other point of the line referencing to the direction selected on #1.

4 "POINT TO TRANSLATE"—This is the character description of the point on which all other points are to be defined. It redefines all other coordinates.

5 "NEW X COORDINATE"—This is a numeric value selected for the X coordinate of the point selected in #4.

6 "NEW Y COORDINATE"—This is a numeric value selected for the Y coordinate of point selected in #4.

The above responses are then accepted to the prompt. The program then calculates the data using the above values. The computer screens will display the newly calculated coordinate values.

Next the technician selects from the "CALCULATE" menu's sub-menu, "DIFFERENCE IN COORDINATES" that appears as a window. This procedure is used to check closures of the tie points. He will be prompted for FROM and TO point numbers, which are the point numbers of a point shot from two different traverse locations. The window then displays the difference of the two points. The closer the difference is to zero the more accurate the closure is. Typically 0.01 of a foot or less is considered an acceptable accuracy. This, however, can be proportional to the size of the building. If the closure is not acceptable it is an indication that the data was not entered to the collector properly (this will not be a problem with direct link from the instrument to data collector as distinct from a manual transfer), a mistake was made in the field, or the instrument is out of calibration.

If the closure is acceptable the technician can then write the DXF files. To do this he selects the "FILE" sub-menu and selects the "WRITE DXF FILES" option. A window editor will appear. This editor will allow the technician to select command identifier points (records) to be extracted. This window will be blank except for these five column headings:

1. TYPE (COMMAND IDENTIFIER)
2. POINT (SELECTION CHARACTERS)
3. FROM-PT
4. TO-PT
5. LAYER

The technician proceeds to fill in the appropriate information under each column for as many character types as he desires to extract to write to the DXF file. A typical entry would be:

1. C for circle
2. Vent extracts all vent records. (use @ to select all C records)
3. V 100 which is the starting record type and point
4. V 300 which is the ending record type and point
5. Vent will separate all found vent entities into a vent layer in the DXF file.

With the above description information logged in the computer and available upon command the technician can proceed to use the CAD program in a conventional manner to command the plotter to print out the desired floor plan such as that shown in FIGS. 1 and 2. Such CAD programs as AUTOCAD and the like may be employed using compatible plotters in a known manner.

Various changes and modifications may be made within this invention as will be apparent to those skilled in the art. Such changes and modifications are within the scope and teaching of this invention as defined in the claims appended hereto.

What is claimed is:

1. A method for devising a floor plan for accurately portraying established physical features of and within an existing building which comprises selecting a traverse point within the building, setting up a surveying instrument on said traverse point, measuring through said instrument horizontal distances to and horizontal angles of prominent points in an interior portion of said building, setting up said instrument in a second traverse point and measuring through said instrument angles and distances to further prominent points in an adjacent interior portion of said building and recording said data from both of said traverse points and their respective angles and distances in a data collector, transferring said data to a computer, providing in said computer software means to convert said data into a format and using said format to provide an X-Y coordinate file compatible with a computer aided drafting system and printing out on paper through a plotter operated by computer aided drafting system said floor plan of the building.

2. The method of claim 1 in which a last traverse point is used to measure horizontal angles and distances to the first traverse point to verify accuracy of closure prior to converting said data into said X-Y coordinate file.

3. The method of claim 1 in which successive traverse points are set up for measuring through said instrument angles and distances further prominent points in an adjacent interior portion of said building, all said successive traverse points being set up within line of sight of immediately prior traverse points.

4. The method of claim 1 in which the thickness of the exterior walls of the building is determined by setting up exterior traverse points at the exterior of the building, and measuring the distance to and angles of exterior corners of said building, said exterior traverse points being set up within line of sight of immediately prior exterior points and at least one of said exterior traverse points being set up within line of sight of one of the traverse points in the interior of the building.

5. The method of claim 1 in which successive traverse points are set up for measuring through said instrument angles and distances further prominent points in an adjacent interior portion of said building, as many successive traverse points being set up as is necessary to measure all prominent points selected in the building.

6. The method of claim 1 in which the surveying instrument is a combined total station instrument which is a combination electronic distance measurement instrument for measuring distance and theodolite for measuring angles operable to provide horizontal distances and horizontal angles.

7. The method of claim 6 in which a prism is employed for the electronic distance measurement, said prism being employed to reflect a beam of light from the electronic distance measurement instrument and said prism having a shank-like probe of predetermined length extending from the rear of the prism with an elongated end of said shank being placed in contact with the prominent point to be measured and fittable within wall corners, and said electronic distance measurement instrument being calibrated to compensate for the distance of the end of said shank from said prism.

8. The method of claim 7 in which said probe has an adjustable shank to provide for length adjustment of said probe between the prism to a pointed contact end of said probe, said pointed contact end being placed in precise contact with the prominent point to be measured.

9. A probe attachable to a prism employed for use with an electronic distance measurement surveying instrument, said probe being attachable to the rear of the prism and having a shank of predetermined length extending from the rear of the prism to a contact end placed horizontally in contact with a prominent point to be measured and being fittable within wall corners.

10. The probe of claim 9 in which said probe has an adjustable shank to provide for length adjustment of said probe between the prism to a pointed contact end of said probe placed horizontally in precise contact with the prominent point to be measured.

* * * * *